United States Patent
Marti et al.

(10) Patent No.: US 10,209,689 B2
(45) Date of Patent: Feb. 19, 2019

(54) SUPERVISOR HISTORY SERVICE IMPORT MANAGER

(71) Applicant: Honeywell International Inc., Morris Plains, NJ (US)

(72) Inventors: Jerry Marti, West Salem, OH (US); Prabhat Ranjan, Bangalore (IN); Bandi Narayanaswamy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 620 days.

(21) Appl. No.: 14/862,715

(22) Filed: Sep. 23, 2015

(65) Prior Publication Data
US 2017/0082990 A1 Mar. 23, 2017

(51) Int. Cl.
*G05B 15/02* (2006.01)
*G05B 19/042* (2006.01)
*G06F 17/30* (2006.01)

(52) U.S. Cl.
CPC ......... *G05B 15/02* (2013.01); *G05B 19/0421* (2013.01); *G05B 2219/2214* (2013.01);
(Continued)

(58) Field of Classification Search
CPC ................ G05B 15/02; G05B 19/0421; G06F 17/30557
See application file for complete search history.

(56) References Cited

U.S. PATENT DOCUMENTS

| | | |
|---|---|---|
| 4,375,637 A | 3/1983 | Desjardins |
| 4,816,208 A | 3/1989 | Woods et al. |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS http://www.loytec.com/products/web/lweb-900, "LWEB-900 Integrated Building Management System," 5 pages, printed Nov. 15, 2014.

(Continued)

*Primary Examiner* — Christine Enad
(74) *Attorney, Agent, or Firm* — Seager, Tufte & Wickhem LLP

(57) ABSTRACT

A system and approach of importing data from site controllers as history imports with a history service by a supervisor in conjunction with a host processor. The history service may reconfigure the history imports to provide the history service virtually full control over the history imports. The history service may runs a history import cycle to ensure that virtually all enabled history imports are performed. The history service may establish a list of history imports to be processed at a beginning of the history import cycle. The history import cycle may query virtually all history imports in an order on a last success time of a history import operation where an oldest time is first on the list. The history service may ensure a maximum number of history imports are running by querying for a count of history imports of an in progress state.

20 Claims, 2 Drawing Sheets

(52) U.S. Cl.
CPC .............. *G05B 2219/24055* (2013.01); *G05B 2219/2642* (2013.01)

(56) References Cited

U.S. PATENT DOCUMENTS

| | | |
|---|---|---|
| 5,042,265 A | 8/1991 | Baldwin et al. |
| 5,161,387 A | 11/1992 | Metcalfe et al. |
| 5,385,297 A | 1/1995 | Rein et al. |
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,949,303 A | 8/1999 | Watson et al. |
| 5,955,306 A | 9/1999 | Beheshti et al. |
| 6,031,343 A | 2/2000 | Recknagel et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |
| 6,295,526 B1 | 9/2001 | Kreiner et al. |
| 6,295,527 B1 | 9/2001 | McCormack et al. |
| 6,301,624 B1 | 10/2001 | Lee et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |
| 6,466,654 B1 | 10/2002 | Cooper et al. |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,643,355 B1 | 11/2003 | Tsumpes |
| 6,643,516 B1 | 11/2003 | Stewart |
| 6,675,591 B2 | 1/2004 | Singh et al. |
| 6,681,156 B1 | 1/2004 | Weiss |
| 6,690,980 B2 | 2/2004 | Powell |
| 6,761,470 B2 | 7/2004 | Sid |
| 6,813,587 B2 | 11/2004 | McIntyre et al. |
| 6,816,811 B2 | 11/2004 | Seem |
| 6,832,120 B1 | 12/2004 | Frank et al. |
| 6,836,794 B1 | 12/2004 | Lucovsky et al. |
| 6,859,827 B2 | 2/2005 | Banginwar |
| 6,870,141 B2 | 3/2005 | Damrath et al. |
| 6,879,253 B1 | 4/2005 | Thuillard |
| 6,892,546 B2 | 5/2005 | Singh et al. |
| 6,919,809 B2 | 7/2005 | Blunn et al. |
| 6,947,972 B2 | 9/2005 | Chun |
| 6,955,302 B2 | 10/2005 | Erdman, Jr. |
| 6,957,110 B2 | 10/2005 | Wewalaarachchi et al. |
| 6,966,060 B1 | 11/2005 | Young et al. |
| 6,970,763 B2 | 11/2005 | Kato |
| 6,973,627 B1 | 12/2005 | Appling |
| 6,990,821 B2 | 1/2006 | Singh et al. |
| 7,006,524 B2 | 2/2006 | Freeman et al. |
| 7,009,510 B1 | 3/2006 | Douglass et al. |
| 7,024,283 B2 | 4/2006 | Bicknell |
| 7,026,925 B2 | 4/2006 | Roche et al. |
| 7,031,880 B1 | 4/2006 | Seem et al. |
| 7,062,389 B2 | 6/2006 | Johnson et al. |
| 7,068,391 B2 | 6/2006 | Dewitte et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,107,268 B1 | 9/2006 | Zawadzki et al. |
| 7,113,085 B2 | 9/2006 | Havekost |
| 7,133,141 B1 | 11/2006 | Abi-Salch |
| 7,155,462 B1 | 12/2006 | Singh et al. |
| 7,171,287 B2 | 1/2007 | Weiss |
| 7,183,907 B2 | 2/2007 | Simon et al. |
| 7,206,646 B2 | 4/2007 | Nilson et al. |
| 7,243,044 B2 | 7/2007 | McCalla |
| 7,250,856 B2 | 7/2007 | Havekost et al. |
| 7,260,619 B2 | 8/2007 | Yoneda |
| 7,272,452 B2 | 9/2007 | Coogan et al. |
| 7,277,018 B2 | 10/2007 | Reyes et al. |
| 7,302,478 B2 | 11/2007 | Conrad |
| 7,308,539 B2 | 12/2007 | Fuhs et al. |
| 7,320,023 B2 | 1/2008 | Chintalapati et al. |
| 7,345,580 B2 | 3/2008 | Akamatsu et al. |
| 7,379,997 B2 | 5/2008 | Ehlers et al. |
| 7,386,586 B1 | 6/2008 | Headley et al. |
| 7,428,726 B1 | 9/2008 | Cowan et al. |
| 7,457,869 B2 | 11/2008 | Kernan |
| 7,460,020 B2 | 12/2008 | Reyes et al. |
| 7,490,319 B2 | 2/2009 | Blackwell et al. |
| 7,496,911 B2 | 2/2009 | Rowley et al. |
| 7,565,225 B2 | 7/2009 | Dushane et al. |
| 7,596,613 B2 | 9/2009 | Silverthorne et al. |
| 7,502,329 B2 | 10/2009 | Li et al. |
| 7,644,371 B2 | 1/2010 | Robertson et al. |
| 7,653,459 B2 | 1/2010 | Pouchak et al. |
| 7,703,073 B2 | 4/2010 | Illowsky et al. |
| 7,734,572 B2 | 6/2010 | Wiemeyer et al. |
| 7,760,081 B2 | 7/2010 | Eiden et al. |
| 7,774,457 B1 | 8/2010 | Talwar et al. |
| 7,782,302 B2 | 8/2010 | Lee et al. |
| 7,819,334 B2 | 10/2010 | Pouchak et al. |
| 7,826,929 B2 | 11/2010 | Wacker |
| 7,870,090 B2 | 1/2011 | McCoy et al. |
| 7,873,719 B2 | 1/2011 | Bishop et al. |
| 7,886,031 B1 | 2/2011 | Taylor et al. |
| 7,890,927 B2 | 2/2011 | Eldridge et al. |
| 7,900,228 B2 | 3/2011 | Stark et al. |
| 7,904,186 B2 | 3/2011 | Mairs et al. |
| 7,904,608 B2 | 3/2011 | Price |
| 7,928,239 B2 | 4/2011 | Dumas et al. |
| 7,933,981 B1 | 4/2011 | Cannon, III et al. |
| 7,941,786 B2 | 5/2011 | Scott et al. |
| 7,953,847 B2 | 5/2011 | Grelewicz et al. |
| 8,059,301 B2 | 11/2011 | Eigenbrodt et al. |
| 8,060,602 B2 | 11/2011 | Singh et al. |
| 8,078,481 B2 | 12/2011 | Steinbarth et al. |
| 8,090,477 B1 | 1/2012 | Steinberg |
| 8,112,162 B2 | 2/2012 | Pouchak et al. |
| 8,144,028 B2 | 3/2012 | LaMothe et al. |
| 8,146,060 B2 | 3/2012 | Lekel |
| 8,185,871 B2 | 5/2012 | Nixon et al. |
| 8,190,273 B1 | 5/2012 | Federspiel et al. |
| 8,218,570 B2 | 7/2012 | Moran et al. |
| 8,224,466 B2 | 7/2012 | Wacker |
| 8,224,763 B2 | 7/2012 | Guralnik et al. |
| 8,224,888 B2 | 7/2012 | Brindle |
| 8,225,292 B2 | 7/2012 | Naslaysky et al. |
| 8,239,500 B2 | 8/2012 | Pouchak |
| 8,255,896 B2 | 8/2012 | Wontorcik et al. |
| 8,301,386 B1 | 10/2012 | Redmond et al. |
| 8,335,593 B2 | 12/2012 | Johnson et al. |
| 8,341,049 B2 | 12/2012 | Gomes et al. |
| 8,341,599 B1 | 12/2012 | Angalet et al. |
| 8,347,291 B2 | 1/2013 | Marwinski |
| 8,352,047 B2 | 1/2013 | Walter |
| 8,417,666 B2 | 4/2013 | Bailor et al. |
| 8,499,060 B2 | 7/2013 | Narayanan et al. |
| 8,527,947 B2 | 9/2013 | Clemm |
| 8,572,502 B2 | 10/2013 | Dharwada et al. |
| 8,572,616 B2 | 10/2013 | Cai et al. |
| 8,577,940 B2 | 11/2013 | Tormasov et al. |
| 8,594,850 B1 | 11/2013 | Gourlay et al. |
| 8,600,556 B2 | 12/2013 | Nesler et al. |
| 8,640,098 B2 | 1/2014 | Nair et al. |
| 8,819,562 B2 | 8/2014 | Nair et al. |
| 8,892,954 B1 | 11/2014 | Gray et al. |
| 8,930,030 B2 | 1/2015 | Bester et al. |
| 8,938,557 B2 | 1/2015 | Meyer et al. |
| 8,954,016 B2 | 2/2015 | Seiler et al. |
| 8,965,850 B2 | 2/2015 | Varadarajan |
| 8,984,169 B2 | 3/2015 | Mera et al. |
| 9,026,253 B2 | 5/2015 | Majewski et al. |
| 9,043,463 B1 | 5/2015 | Cohn et al. |
| 9,122,535 B2 | 9/2015 | Soundararajan et al. |

(56) References Cited

U.S. PATENT DOCUMENTS

| | | |
|---|---|---|
| 9,158,531 B2 | 10/2015 | Lin |
| 9,239,718 B2 | 1/2016 | Grinberg et al. |
| 9,280,337 B2 | 3/2016 | Palaniappan |
| 9,389,850 B2 | 7/2016 | Walter et al. |
| 9,395,711 B2 | 7/2016 | Clark et al. |
| 9,423,789 B2 | 8/2016 | Cornett et al. |
| 9,578,465 B2 | 2/2017 | Da Silva Neto et al. |
| 2002/0002425 A1 | 1/2002 | Dossey et al. |
| 2002/0073076 A1 | 6/2002 | Xu et al. |
| 2002/0122073 A1 | 9/2002 | Abrams et al. |
| 2002/0152298 A1 | 10/2002 | Kikta et al. |
| 2003/0078677 A1 | 4/2003 | Hull et al. |
| 2003/0101009 A1 | 5/2003 | Seem |
| 2003/0171851 A1 | 9/2003 | Brickfield et al. |
| 2003/0217357 A1 | 11/2003 | Parry |
| 2004/0027004 A1 | 2/2004 | Bayoumi et al. |
| 2004/0138981 A1 | 7/2004 | Ehlers et al. |
| 2004/0143510 A1 | 7/2004 | Haeberle et al. |
| 2004/0230328 A1 | 11/2004 | Armstrong et al. |
| 2005/0038571 A1 | 2/2005 | Brickfield et al. |
| 2005/0043862 A1 | 2/2005 | Brickfield et al. |
| 2005/0071457 A1 | 3/2005 | Yang-Huffman et al. |
| 2005/0143863 A1 | 6/2005 | Ruane et al. |
| 2005/0193285 A1 | 9/2005 | Jeon |
| 2005/0201393 A1 | 9/2005 | Hatayama et al. |
| 2005/0203490 A1 | 9/2005 | Simonson |
| 2005/0222889 A1 | 10/2005 | Lai et al. |
| 2006/0020962 A1 | 1/2006 | Stark et al. |
| 2006/0038672 A1 | 2/2006 | Schoettle |
| 2006/0058923 A1 | 3/2006 | Kruk et al. |
| 2006/0064305 A1 | 3/2006 | Alonso |
| 2006/0069886 A1 | 3/2006 | Sandoval |
| 2006/0077726 A1 | 4/2006 | Simmitsu |
| 2006/0095835 A1 | 5/2006 | Kennedy et al. |
| 2006/0136558 A1 | 6/2006 | Sheehan et al. |
| 2006/0168013 A1 | 7/2006 | Wilson et al. |
| 2006/0253205 A1 | 11/2006 | Gardiner |
| 2006/0265708 A1 | 11/2006 | Blanding et al. |
| 2007/0078913 A1 | 4/2007 | Crescenti et al. |
| 2007/0123249 A1 | 5/2007 | Sun |
| 2007/0198674 A1 | 8/2007 | Li et al. |
| 2008/0005787 A1 | 1/2008 | Aldred |
| 2008/0010049 A1 | 1/2008 | Pouchak et al. |
| 2008/0189162 A1 | 8/2008 | Ganong et al. |
| 2008/0301668 A1 | 12/2008 | Zachmann |
| 2009/0055914 A1 | 2/2009 | Azami |
| 2009/0106684 A1 | 4/2009 | Chakra et al. |
| 2009/0113037 A1 | 4/2009 | Pouchak |
| 2009/0205040 A1 | 8/2009 | Zunke |
| 2009/0287526 A1 | 11/2009 | Ramkumar et al. |
| 2009/0295571 A1 | 12/2009 | Hosey |
| 2009/0319532 A1 | 12/2009 | Akelbein et al. |
| 2010/0031324 A1 | 2/2010 | Strich et al. |
| 2010/0106543 A1 | 4/2010 | Marti |
| 2010/0131653 A1 | 5/2010 | Dharwada et al. |
| 2010/0131877 A1 | 5/2010 | Dharwada et al. |
| 2010/0198651 A1 | 8/2010 | Johnson et al. |
| 2010/0251184 A1 | 9/2010 | Majewski et al. |
| 2010/0286937 A1 | 11/2010 | Hedley et al. |
| 2011/0010654 A1 | 1/2011 | Raymond et al. |
| 2011/0087731 A1 | 4/2011 | Wong et al. |
| 2011/0093493 A1* | 4/2011 | Nair ............ G06Q 10/06 707/769 |
| 2011/0098863 A1 | 4/2011 | Miki |
| 2011/0113360 A1 | 5/2011 | Johnson et al. |
| 2011/0196539 A1* | 8/2011 | Nair ............ G05B 19/41865 700/276 |
| 2011/0298608 A1 | 12/2011 | Ranjan et al. |
| 2011/0316688 A1 | 12/2011 | Ranjan et al. |
| 2012/0005731 A1 | 1/2012 | Lei et al. |
| 2012/0011189 A1* | 1/2012 | Werner ............ H04L 29/12471 709/202 |
| 2012/0011496 A1 | 1/2012 | Shimamura |
| 2012/0166992 A1 | 6/2012 | Huynh et al. |
| 2013/0218889 A1* | 8/2013 | Marti ............ G06F 17/30557 707/736 |
| 2014/0114440 A1 | 4/2014 | Marti et al. |
| 2014/0280878 A1 | 9/2014 | Hardin et al. |
| 2014/0289202 A1 | 9/2014 | Chan et al. |
| 2014/0344798 A1 | 11/2014 | Sasaki |
| 2015/0007157 A1 | 1/2015 | Park et al. |
| 2015/0105878 A1 | 4/2015 | Jones et al. |
| 2015/0112989 A1 | 4/2015 | Marti et al. |
| 2015/0201020 A1 | 7/2015 | Gueta |
| 2015/0295998 A1 | 10/2015 | Morrill et al. |
| 2016/0011573 A1 | 1/2016 | Marti et al. |
| 2016/0203056 A1* | 7/2016 | Shimizu ............ G06F 11/1453 707/649 |
| 2017/0060918 A1* | 3/2017 | Iyer ............ G06F 21/6218 |
| 2017/0102680 A1 | 4/2017 | Marti et al. |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Samsung, "Intelligent Building Management System, ControlCity-NX," 20 pages, May 31, 2012.

U.S. Appl. No. 14/862,858, filed Sep. 23, 2015.

Adobe Acrobat 6.0 Standard, Version 6.0.2, Screenshots, 2 pages, May 18, 2004.

Atere-Roberts et al., "Implementation of a Computerized Maintenance Management System for the City of Atlanta," 13 pages, Proceedings of the Water Environment Federation, Jan. 1, 2002.

Bersoff et al., "Impacts of Life Cycle Models on Software," Communications of the ACM, vol. 34, No. 8, pp. 104-118, Aug. 1991.

Business Objects, Crystal Reports Acess, Format, and Integrate Data, 4 pages, Dec. 2003.

Honeywell Spyder Bacnet User's Guide, 242 pages, Revised Jul. 2009.

Honeywell Spyder User's Guide 202 pages, Released Jul. 2007.

Honeywell, "ComfortPoint Open BMS Release 100," Specification and Technical Data, 13 pages, Jun. 2012.

Honeywell, "Excel Building Supervisor-Integrated R7044 and FS90 Ver. 2.0," Operator Manual, 70 pages, Apr. 1995.

Honeywell, "Excel 15B W7760B Building Manager," User's Guide, 84 pages, Revised Jan. 2005.

http://blogs.msdn.com/b/khen1234/archive/2005/05/11/416392.aspx, "Regular Expressions in T-SQL," 4 pages, May 11, 2005.

http://domin.dom.edu/documents/emaildocs/outlook/, "Outlook Web Access 2003," 19 pages, printed Nov. 7, 2013.

http://en.wikipedia.org/wiki/Jar_(file_format), "JAR (file Format)—Wikipedia, the Free Encyclopedia," 3 pages, printed Dec. 26, 2009.

http://www.de2m.com/DE2R_Technical.html, "Data Enabled Enterprise Repository (DE2R) Technical Overview," 4 pages, printed Mar. 8, 2013.

http://www.google.com/maps, "Google Maps, Pin Location," 1 page, prior to Nov. 21, 2008.

Johnson Controls, "Fx Workbench, User's Guide," 818 pages, issued May 19, 2008, (this article will be uploaded to USPTO website in 5 parts).

Kalavade et al., "A Hardware-Software Codesign Methodology for DSP Applications," IEEE Design and Test of Computers, pp. 16-28, 1993.

Magnusson et al., "Simics: A Full Simulation Platform," IEEE, pp. 50-58, 2002.

(56) References Cited

OTHER PUBLICATIONS

McCown et al., "APSIM: A Novel Software System for Model Development, Model Testing and Simulation in Agricultural Systems Research," Agricultural Systems, vol. 50, pp. 255-271, 1996.
Microsoft Word Screen Shots, 2 pages, prior to Nov. 21, 2008.
Niagara, "Niagara AX-3.x User Guide," Tridium Inc., 436 pages, 2007.
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.
Pressman, "Software Engineering Notes—Compiled from Software Engineering A Practitioner's Approach," Fifth Edition, 67 pages, 2009.
Siemens, BACnet for DESIGO 27 Pages, prior to Dec. 30, 2009.
Simunic et al, "Cycle-Accurate Simulation of Energy Consumption in Embedded Systems," ACM, pp. 867-872, 1999.
Trane, "System Programming, Tracer Summit Version 14, BMTW-SVP01D-EN," 623 pages, 2002, (this article will be uploaded to USPTO website in 3 parts).
Trane, "Tracer MP580/581 Programmable Controllers," CNT-PRC002-EN, Mar. 2003.
Tridium, "NiagaraAX Product Model Overview," 7 pages, 2005.
Tridium, "Tridium & Niagara Framework Overview," 9 pages, prior to Oct. 28, 2008.
Vykon by Tridium, "Niagara Browser Access Guide," 125 pages, revised Aug. 15, 2002.
Vykon by Tridium, "Niagara Networking & Connectivity Guide," Niagara Release 2.3, 245 pages, 2002.

* cited by examiner

SUPERVISOR HISTORY SERVICE IMPORT MANAGER

BACKGROUND

The present disclosure pertains to controllers and particularly history service of controllers.

SUMMARY

The disclosure reveals a system and approach of importing data from site controllers as history imports with a history service by a supervisor in conjunction with a host processor. The history service may reconfigure the history imports to provide the history service virtually full control over the history imports. The history service may run a history import cycle to ensure that virtually all enabled history imports are performed. The history service may establish a list of history imports to be processed at a beginning of the history import cycle. The history import cycle may query virtually all history imports in an order on a last success time of a history import operation where an oldest time is first on the list. The history service may ensure a maximum number of history imports are running by querying for a count of history imports of an in progress state.

DESCRIPTION

Figure 1:
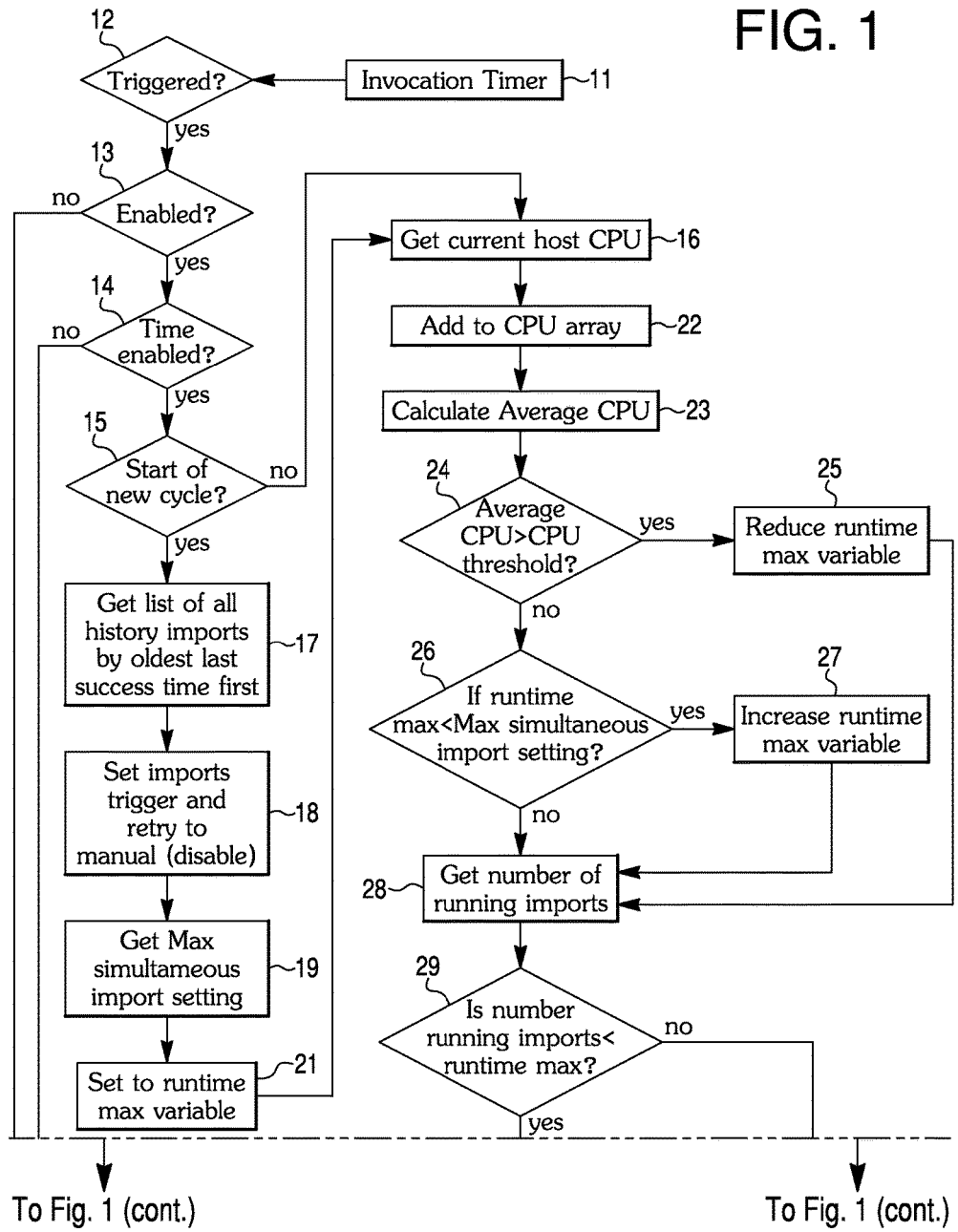
FIG. 1 is a diagram of a history import management arrangement for a controller.
Figure 1:
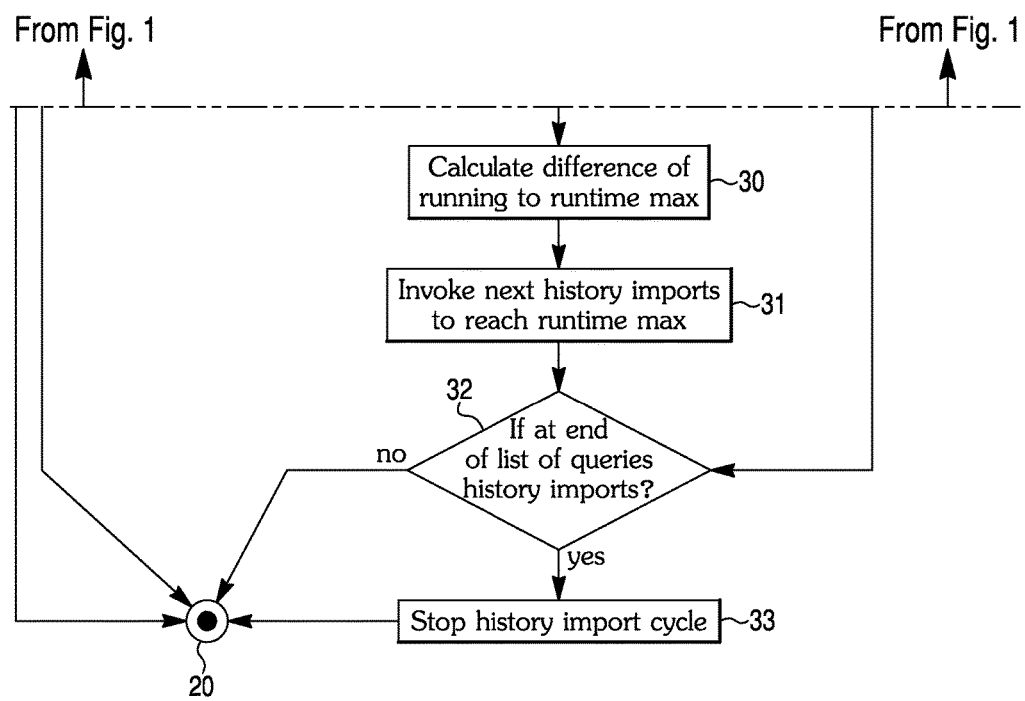

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

A Novar™ Opus™ supervisor may be a target application to provide a present feature. A user of the Novar Opus supervisor may manage and communicate with hundreds or thousands of remote site controllers from a centralized location via an intranet. A site controller may be referred to as an XCM controller or XCM. The XCM in turn may manage and communicate with tens or hundreds of field controllers within the site that perform real-time control of building equipment such as HVAC units, lighting panels, metering and refrigeration circuits.

An existing Opus supervisor may have an ability to pull history data from points being logged with remote site XCM controllers. An approach to perform the pull history data task may be to create within the Opus supervisor application a history import object for each point or group of points. Due to a scale of a customer environment, history data may be pulled from thousands to millions of history import objects. A design of the history import object may be as follows. The object may function as an independent execution unit that functions without regard to its impact on the operating environment, the single Opus supervisor application (process).

The history import object may be configured with a trigger time of day setting which when the time is reached, will initiate the object's action to connect to the remote XCM and begin to transfer new history data from the XCM and write to an Opus SQL server database. This may take several minutes to complete, depending on the host server size and other asynchronous operations within the Opus supervisor process. Typically, virtually all the history import objects trigger times may be configured to trigger randomly over a 24 hour period so that one would not intentionally trigger too many trigger times at the same time. Also, there may be a fault retry timer so that if the point encounters a fault condition, it may be rescheduled to re-trigger the history import again some number of minutes later. An issue that Novar may encounter with this design is that runtime conditions vary, and due to slowing performance of the operating environment, history objects would also slow down, causing more to trigger asynchronously compounding a slow performance condition. Then some history imports may fault resulting in the history import fault retry timer to retriggering the history import again. The result may be that there are so many simultaneous history imports running that the single Opus supervisor process could become un-usable even to the point that it would no longer be communicated with. Also, another compounding factor is that as these failure conditions occur, an importation of new history data may get farther behind causing history imports to take longer to complete contributing to more imports running, simultaneously. Through diagnostic efforts, it appeared to be found that an Opus supervisor process was consuming nearly 100 percent CPU (central processing unit) and large amounts of the host server system memory. The only recourse appeared to kill the Opus supervisor and then restart the supervisor.

The present approach may provide a solution to the stated issue by providing the following product features and the necessary user activities required to use these features. The Opus supervisor may provide a new Opus history service with improved runtime management of the history import operations. A new service operation may be the present feature.

An operational goal of the new Opus history service may be to intelligently manage and control the multiple history import processes ensuring that the history data is collected in a timely manner and at the same time not to allow the imports to overtake host server resources thus causing the Opus supervisor to become unstable or unusable.

The Opus history service will not necessarily replace the history import objects described as central to the issue to resolve. Instead, the service may re-configure the imports so they can be centrally managed by the history service. A first operational action of the service may be to reconfigure the history import objects by disabling the existing invocation timer and retry timer that cause a failure condition. Once the timers are disabled, the service may have full control over the history import objects.

The Opus history service may be designed to run a scheduled history import cycle to ensure that virtually all enabled history imports are performed. Within the cycle, there may be a periodic interval timer allowing the host operational conditions to be monitored, and for the management of the history import objects execution. At the beginning of an import cycle, the service may establish a complete list of history imports that will be processed. The service cycle may initially query for all the history import objects ordering on the last success time of the import operation where the oldest success time is first in the list. This may ensure that the service is always invoking the history importation for the points with the oldest data in the supervisor database ensuring that one eliminates a risk of lost data due to slow performance. Once a cycle is started, the service may then run on a specified interval time. On each interval, the service may ensure that the specified maximum number of history imports is running by querying for the count of imports in an "In progress" state. If the specified number of simultaneous imports is not currently in progress, the service may programmatically invoke a difference ensuring the fixed limits of imports are always running. Once a history import object is invoked to collect history, the history import object may be in the "In progress" state to completion at which time it will return to the idle state. On each execution interval, the service may also read and average the host CPU utilization using the last five readings. If the average host CPU exceeds the specified CPU threshold, then the service may incrementally reduce the number of allowable simultaneous imports directly causing the CPU utilization to reduce. When the average CPU drops below the threshold, the service may incrementally resume up to the specified maximum. Once all the history imports are completed, the cycle may end. A new cycle may be scheduled and the process can be repeated.

Key features may incorporate centralized management of history import operations, continuously run imports at a controlled user definable level, automatic performance tuning by use of CPU monitoring, and ensure that history imports with oldest data are collected first.

The Opus history service may exist in the Opus supervisor services folder. If the service does not already exist, the user may select the service from the Opus history alarm SE module palette and add the Opus history service to the Opus supervisor services. Initially, to configure the Opus history service, the user may set the following operational parameters for the service. An import management enable and/or disable setting may enable the new history import management operation. An import management enable date and time span (optional) may allow a user to specify a date and/or time span when the new history import management operation is enabled. If this operational parameter is not configured, the service may run at all times.

An import management interval time in seconds may be set. This parameter may indicate how often the new history import management can run. When the management runs, the service may recalculate the CPU average and ensure that the correct numbers of imports are running. Max simultaneous imports may be the maximum number of simultaneous imports that the service will allow to run.

A CPU threshold may be where the average host CPU is compared to the CPU threshold value where the service may reduce simultaneous history imports if the average is above this threshold. Number of CPU readings may be a number of CPU readings used in the average compared to the CPU threshold.

The settings of the operational parameters may be configured one time and only adjusted if operational tuning is required for performance concerns. The remaining effort to use the present approach may incorporate standard user activities to join new site XCM controllers to the Opus supervisor. As a new XCM is joined, the history imports required for that XCM may be created and subsequently be available to be managed by a new Opus history service.

In addition to the configuration activities, the Opus history service may provide monitoring views allowing the user to observe operational conditions. These views may incorporate details on the number of running imports, the average CPU and time and date of when a current import cycle started and time and date of when last import was triggered. Also, tabular views of active imports in progress and faulted imports may be available.

Finally, the Opus history service may provide an application programming interface (API) that can allow external applications to query the service for operating statuses. The statuses may incorporate the average CPU and the date and time of the oldest history imported data. The approach may allow an external app to evaluate if the Opus history service is fully loaded and can balance an applied load to ensure optimal performance. This new feature may be added to an existing company (e.g., Honeywell™-Novar™) product by the name of Opus supervisor.

FIG. 1 is a diagram of a history import management arrangement. An invocation timer may cause trigger action. The timer may be represented by a symbol 11. Other items, such as steps or objects represented by a symbol, may be indicated as being at, of, by, or the like of the symbol. The symbol may be a block, square, diamond or another shape.

A question of whether there is a trigger may be asked at a symbol 12. If an answer is yes, then a question of whether there was an enablement may be asked at symbol 13. If an answer is no, then the flow of the diagram may stop at symbol 20. If the answer is yes, then a question whether there is a time enablement may be asked at symbol 14. If an answer is no, then the flow of the diagram may stop at symbol 20. If the answer is yes, then a question of whether there is a start of a new cycle may be asked at symbol 15. If an answer is no, then one may get a current host CPU at a symbol 16. If the answer is yes, then at symbol 17, a list of virtually all history imports may be obtained by oldest last success time first. At symbol 18, a setting of an imports trigger and a retry to a manual (disable) may be set. A max simultaneous import setting may be obtained at a symbol 19. A setting may be made to a runtime max variable at symbol 21. Then at the symbol 16, a current host CPU may be obtained, which may be added to a CPU array at a symbol 22. An average CPU may be calculated at symbol 23. A question at symbol 24 is whether the average CPU is greater than a CPU threshold. If an answer is yes, then a runtime max variable may be reduced at symbol 25 and a number of running imports may be obtained at symbol 28. If the answer is no, then a question whether a runtime max is less than a simultaneous import setting, may be asked at symbol 26. If an answer is yes, then the runtime max variable may be increased at symbol 27 and a number of running imports may be obtained at symbol 28. If the answer is no, then just a number of running imports may be obtained at symbol 28. At symbol 29, a question whether a number of running imports is less than a runtime max. If an answer is yes, then a difference of running to runtime max may be calculated at symbol 30 and then next history imports may be invoked to reach the runtime max at symbol 31. A question is whether one at an end of a list of queries history imports may be asked at symbol 32. If an answer is yes, then a history import cycle may be stopped at symbol 33. If the answer is no, then the flow of the present diagram may end at symbol 20.

With regard to the question at symbol 29, if the answer is no, then the question at symbol 32 may be asked with the answer no, thus leading to the end of a flow in the diagram at symbol 20. If the answer is yes to the question at symbol 32, then the history import cycle may be stopped at symbol 33 with a subsequent end of the flow of the present diagram at symbol 20.

To recap, a supervisor history service import manager may incorporate a supervisor, a plurality of site controllers connectable to the supervisor, a plurality of field controllers connectable to each of the plurality of site controllers, and building equipment controlled by the plurality of field controllers. The supervisor may pull history data from the site controllers as history imports. The supervisor may incorporate a history service for runtime management of the history imports. The history service may reconfigure the history imports to provide the history service virtually full control over the history imports by disabling one or more items of a group having an invocation timer and a retry timer. The history service may run a history import cycle to ensure that virtually all enabled history imports are performed. The history service may establish a list of history imports to be processed at a beginning of the history import cycle. The history import cycle may query virtually all history imports in an order on a last success time of a history import operation where an oldest time is first on the list.

The history service may ensure a maximum number of history imports are running by querying for a count of history imports of an in progress state. If a specified number of history imports is not in service, the history service may programmatically invokes a difference to ensure fixed limits of history imports always running.

Once a history import is invoked to collect history, the history import may be in the in progress state to completion at which time the history import may return to an idle state. Upon each execution interval, the history service may read and average last X readings of CPU utilization of a host processor of the supervisor. X may be a numeral equal to or greater than one.

If an average CPU of the last X readings exceeds a pre-determined threshold, then the history service may decrement a number of allowable historical imports to cause the average CPU of the last X readings to decrease. If an average CPU of the last X readings is below the pre-determined threshold, then the history service may incrementally increase the number of allowable historical imports to cause the average CPU of the last X readings to increase.

Upon completion of the history imports, the history import cycle may end. A new history import cycle may be scheduled and the process may be repeated.

The history service may provide monitoring views. One or more monitoring views may be selected from a group having a number of running history imports, an average utilization time of a host processor unit of the supervisor, a time and date of a start of a current history import cycle, a time and date of a trigger of a last history import, and lists of active history imports in progress and faulted history imports.

The history service may provide an application programming interface that permits external applications to query the history service for operating status.

A supervisor history service system may incorporate a supervisor, one or more remote site controllers connected via an intranet to the supervisor, one or more field controllers connected to each site controller, and building equipment connected to each field controller. The supervisor may pull data from points logged with the one or more site controllers. The supervisor may have an application that has a history import for each point or group of points logged with a site controller. The supervisor may incorporate a history service that configures the history imports so as to be managed by the history service. The history service may run a scheduled history import cycle. The history import cycle may have an interval timer.

A list of history imports to be processed by the history service is established at a beginning of the history import cycle.

The history import cycle of the history service may initially query history imports having an order where the history import that has an oldest success time is first on the list which ensures that history importation is for points having oldest data in a supervisor database.

Once a cycle is started, the history service may run on a specified time interval. On each interval, the history service may ensure that a maximum number of history inputs is running by querying a count of history imports in an in progress state.

If the maximum number of history imports is not in process, the history service may programmatically invoke a difference to ensure fixed limits of history imports that are running.

For each interval, the history service may read and average the last readings of utilization of a host processor.

If an average of the X readings of CPU utilization of the host processor exceeds a predetermined threshold, then the history service may incrementally reduce a number of history imports running that causes a reduction of the average of the X readings of utilization of the host processor to the predetermined threshold. If the average CPU of the X readings of utilization of the host processor is less than the predetermined threshold, then the history service may incrementally increase the number of history imports running to cause an increase of the average of the X readings of utilization of the host processor up to the predetermined threshold.

When all of the history imports are completed, the history import cycle may be ended. A new history import cycle may be scheduled to repeat a run of the history service of history imports.

A history service import management mechanism may incorporate a supervisor, site controllers in communication with the supervisor, field controllers in communication with each site controller, and building equipment controlled in real time by the field controllers. The building equipment may incorporate one or more items from a group having heat, ventilation and air conditioning units, lighting panels, metering and refrigeration circuits. The supervisor may pull history data from the site controllers as history imports. The supervisor may incorporate a history service for runtime management of the history imports. The history service may reconfigure the history imports to provide the history service virtually full control over the history imports by disabling one or more items of a group having an invocation timer and a retry timer.

The history service may run a history import cycle to ensure that virtually all enabled history imports are performed. The history service may establish a list of history imports to be processed at a beginning of the history import cycle. The history import cycle may query virtually all history imports in an order on a last success time of a history import operation where an oldest time is first on the list.

The history service may ensure a maximum number of history imports are running by querying for a count of history imports of an in progress state. If a specified number of history imports is not in service, the history service may programmatically invoke a difference to ensure fixed limits of history imports are always running. Once a history import is invoked to collect history, the history import may be in the in progress state to completion at which time the history import may return to an idle state. Upon each execution interval, the history service may read and average last N readings of CPU utilization of a host processor of the supervisor. N may be a numeral equal to or greater than one.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A supervisor history service import manager comprising:
   a supervisor having a central processing unit (CPU) and a database;
   a plurality of site controllers connectable to the supervisor;
   a plurality of field controllers connectable to each of the plurality of site controllers; and
   building equipment controlled by the plurality of field controllers; and
   wherein:
   the the CPU connects to the site controllers and transfers history data from the site controllers as history imports to the database;
   the supervisor comprises a history service for runtime management of the history imports;
   the history service is configured such that the CPU:
      disables one or more times of an invocation timer of the history imports and a retry timer of the history imports to reconfigures the history imports and provide the history service control over the history imports;
      the runs a history import cycle to ensure that virtually all enabled history imports are performed;
      establishes a list of history imports to be processed at a beginning of the history import cycle and queries the history imports in an order on a last success time of a history import operation where an oldest time is first on the list.

2. The manager of claim 1, wherein:
   the history service ensures a maximum number of history imports are running by querying for a count of history imports of an in progress state; and
   if a specified number of history imports is not in service, the history service programmatically invokes a difference to ensure fixed limits of history imports always running.

3. The manager of claim 2, wherein:
   once a history import is invoked to collect history, the history import is in the in progress state to completion at which time the history import returns to an idle state;
   upon each execution interval, the history service reads and averages last X readings of CPU utilization of CPU of the supervisor; and
   X is a numeral equal to or greater than one.

4. The manager of claim 3, wherein:
   if an average CPU utilization of the last X readings exceeds a pre-determined threshold, then the history service decrements a number of allowable historical imports to cause the average CPU utilization of the last X readings to decrease; and
   if an average CPU utilization of the last X readings is below the pre-determined threshold, then the history service incrementally increases the number of allowable historical imports to cause the average CPU utilization of the last X readings to increase.

5. The manager of claim 2, wherein upon completion of the history imports, the history import cycle ends.

6. The manager of claim 5, wherein a new history import cycle is scheduled and the process is repeated.

7. The manager of claim 2, wherein the history service provides an application programming interface that permits external applications to query the history service for operating status.

8. The manager of claim 1, wherein the history service provides monitoring views.

9. The manager of claim 8, wherein one or more monitoring views are selected from a group comprising a number of running history imports, an average utilization time of the CPU of the supervisor, a time and date of a start of a current history import cycle, a time and date of a trigger of a last history import, and lists of active history imports in progress and faulted history imports.

10. A supervisor history service system comprising:
    a supervisor having a central processing unit (CPU) and a database;
    one or more remote site controllers connected via an intranet to the CPU;
    one or more field controllers connected to each site controller; and
    building equipment connected to each field controller; and
    wherein:
    the CPU connects to one or more site controllers and transfers data from points logged with the one or more site controllers to the database;
    the CPU has an application that has a history import for each point or group of points logged with a site controller;
    the supervisor comprises a history service that is configured such that the CPU:
       configures the history imports so as to be managed by the history service;
       runs a scheduled history import cycle that has an interval timer.

11. The system of claim 10, wherein a list of history imports to be processed by the history service is established at a beginning of the history import cycle.

12. The system of claim 11, wherein the history import cycle of the history service initially queries history imports having an order where the history import that has an oldest success time is first on the list which ensures that history importation is for points having oldest data in the database.

13. The system of claim 12, wherein:
    once a cycle is started, the history service runs on a specified time interval; and
    on each interval, the history service ensures that a maximum number of history inputs is running by querying a count of history imports in an in progress state.

14. The system of claim 13, wherein if the maximum number of history imports is not in process, the history service programmatically invokes a difference to ensure fixed limits of history imports that are running.

15. The system of claim 14, wherein for each interval, the history service reads and averages the last readings of utilization of the CPU.

16. The system of claim 15, wherein:
    if an average of the X readings of CPU utilization of the CPU exceeds a predetermined threshold, then the history service incrementally reduces a number of history imports running that causes a reduction of the average of the X readings of utilization of the CPU to the predetermined threshold; and if the average CPU of the X readings of utilization of the CPU is less than the predetermined threshold, then the history service incrementally increases the number of history imports running to cause an increase of the average of the X readings of utilization of the CPU up to the predetermined threshold.

17. The system of claim 13, wherein:

when all of the history imports are completed, the history import cycle is ended; and a new history import cycle is scheduled to repeat a run of the history service of history imports.

18. A history service import management mechanism comprising:

a supervisor having a central processing unit (CPU) and a database;

site controllers in communication with the supervisor;

field controllers in communication with each site controller; and building equipment controlled in real time by the field controllers; and wherein:

the building equipment incorporates one or more items from a group comprising heat, ventilation and air conditioning units, lighting panels, metering and refrigeration circuits;

the CPU is configured to connect to the site controllers and transfer history data from the site controllers as history imports to the database;

the supervisor comprises a history service for runtime management of the history imports; and the history service is configured such that the CPU disables one or more items of an invocation timer of a history import and a retry timer of the history import to reconfigure the history imports and provide the history service control over the history imports.

19. The mechanism of claim 18, wherein:

the history service is configured such that the CPU:

can run a history import cycle to ensure that virtually all enabled history imports are performed;

establishes a list of history imports to be processed at a beginning of the history import cycle and queries the history imports in an order on a last success time of a history import operation where an oldest time is first on the list.

20. The mechanism of claim 19, wherein:

the history service ensures a maximum number of history imports are running by querying for a count of history imports of an in progress state;

if a specified number of history imports is not in service, the history service programmatically invokes a difference to ensure fixed limits of history imports are always running;

once a history import is invoked to collect history, the history import is in the in progress state to completion at which time the history import returns to an idle state;

upon each execution interval, the history service reads and averages last N readings of CPU utilization of the CPU of the supervisor; and N is a numeral equal to or greater than one.

* * * * *